Dec. 22, 1964 W. M. OLESON 3,162,725

CHARACTER GENERATOR

Filed Jan. 23, 1962 3 Sheets-Sheet 1

INVENTOR.
WILLIAM M. OLESON

BY

ATTORNEYS

INVENTOR.
WILLIAM M. OLESON
BY
ATTORNEYS

Dec. 22, 1964

W. M. OLESON 3,162,725

CHARACTER GENERATOR

Filed Jan. 23, 1962

3 Sheets-Sheet 3

INVENTOR.
WILLIAM M. OLESON

BY

ATTORNEYS

3,162,725
CHARACTER GENERATOR

William M. Oleson, 2234 Guy St., San Diego 3, Calif.

Filed Jan. 23, 1962, Ser. No. 168,291
2 Claims. (Cl. 178—79)
(Granted under Title 35, U.S. Code (1952), sec. 266)

The invention described herein may be manufactured and used by or for the Government of the United States of America for governmental purposes without the payment of any royalties thereon or therefor.

The invention pertains to a character generator and more particularly one that is binary coded.

One type of binary coded character generator employs a motor driven commutator to repetitively generate a single character. The characters are generated at a very low rate and the apparatus has no high speed capability. The equipment is bulky and is not suited for rack mounting along with electronic circuit chassis. The character generated by the apparatus is useful only in binary equipment as the last bit in the character, the stop bit, is longer than the preceding bits.

It is an object of the present invention to provide a character generator that will continuously generate any one of a plurality of characters.

It is another object of the invention to provide a character generator that generates characters in both serial and parallel fashion.

It is still another object of the instant invention to provide a character generator which is capable of high output rates and may be adjusted to produce any one of a plurality of rates.

It is an advantage of the present invention that it employs no mechanically driven rotary switches or commutators.

It is a feature of the present invention that the character bit length may be varied.

It is a further advantage of the invention that it is compact and may be operated as a portable unit.

The novel features that are considered characteristic of the invention are set forth with particularity in the appended claims. The invention, itself, both as to its organization and method of operation, as well as additional objects and advantages thereof, will best be understood from the following description when read in connection with the accompanying drawings wherein:

Figure 1:
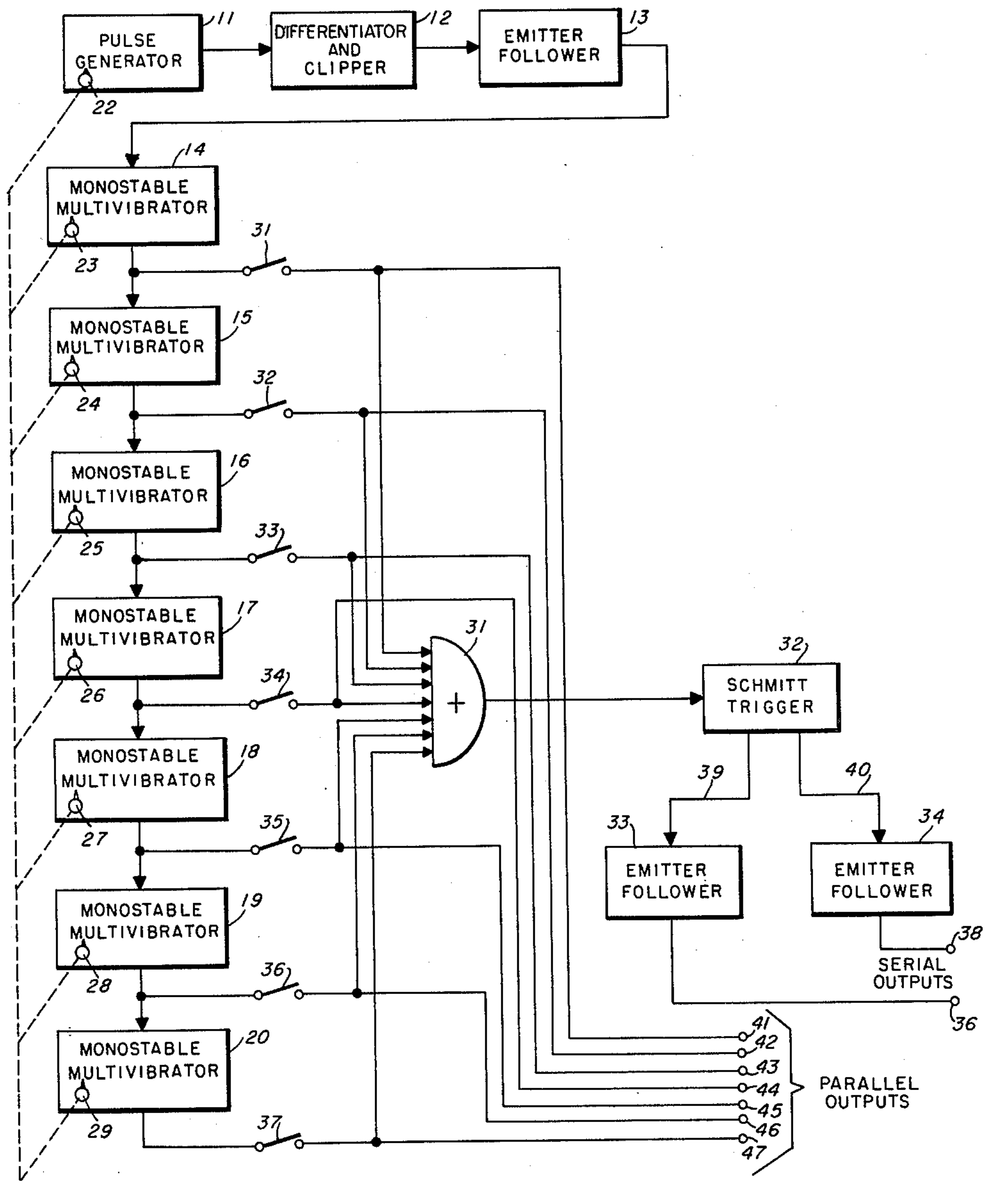
FIG. 1 is a block diagram of a circuit in accordance with the invention.

In the embodiment of the invention disclosed in FIG. 1, clock pulses are obtained at the output of pulse generator 11 and coupled to differentiator and clipper circuit 12. The clock pulse generator 11 is capable of producing pulses at a plurality of repetition rates. The repetition rate is controlled by switch 22. The output of the differentiator and clipper circuit is coupled to emitter follower 13. Multivibrators 14–19 are monostable, "one-shot" multivibrators. In normal operation they are stable and produce an output voltage of fixed level which for convenience will be labeled the 1 level hereafter. When the multivibrators are triggered with a suitable input pulse they switch to their unstable condition for a definite, predetermined period. While in the unstable state the output voltage assumes a different level which for convenience will be labeled the 0 level hereafter. Thus, the multivibrators are always producing 1 or 0 output pulses depending on whether they are in the stable or unstable state, respectively. The period during which multivibrators 14–20 remain in the unstable state may be varied by moving switches 23 to 29, respectively. These switches are ganged together with switch 22 of pulse generator 11. The multivibrators are connected in series, the output of the first multivibrator being coupled to the trigger input of the second multivibrator, and so on. The output of emitter follower 13 is coupled to the trigger input of multivibrator 14. Single-pole, single throw switches 31 to 37 are coupled to the outputs of multivibrators 14 to 20, respectively. The other side of these switches are coupled to Or gate 31. Or gate 31 is a conventional logic circuit of the type that functions in accordance with the following logic equation where F is the output, and A, B, C and N are inputs:

$$F=A+B+C+N$$

Or gate circuits are disclosed in detail in chapter 12 of General Electric Transistor Manual, fifth edition, 1960. The seven inputs of Or gate 31 are coupled to parallel output terminals 41 to 47, respectively, and to switches 31 to 37, respectively.

A Schmitt trigger is a bistable trigger device whose state depends on the magnitude of the input voltage. An output pulse of constant amplitude is produced only as long as the input voltage exceeds a certain value. Output voltages may be removed at two separate output points in the circuit. The voltages produced at the two outputs are 180 degrees out of phase with each other, that is, when a negative-going pulse is produced at one output a positive-going pulse is produced at the other output. The output voltage is always one level or another and is thus binary coded.

Schmitt trigger 32 is coupled to the output of Or gate 31. The outputs of trigger 32 are coupled to emitter followers 33 and 34, respectively. Serial output terminals 36 and 38 are connected to the outputs of emitter followers 33 and 34, respectively.

Figure 3:
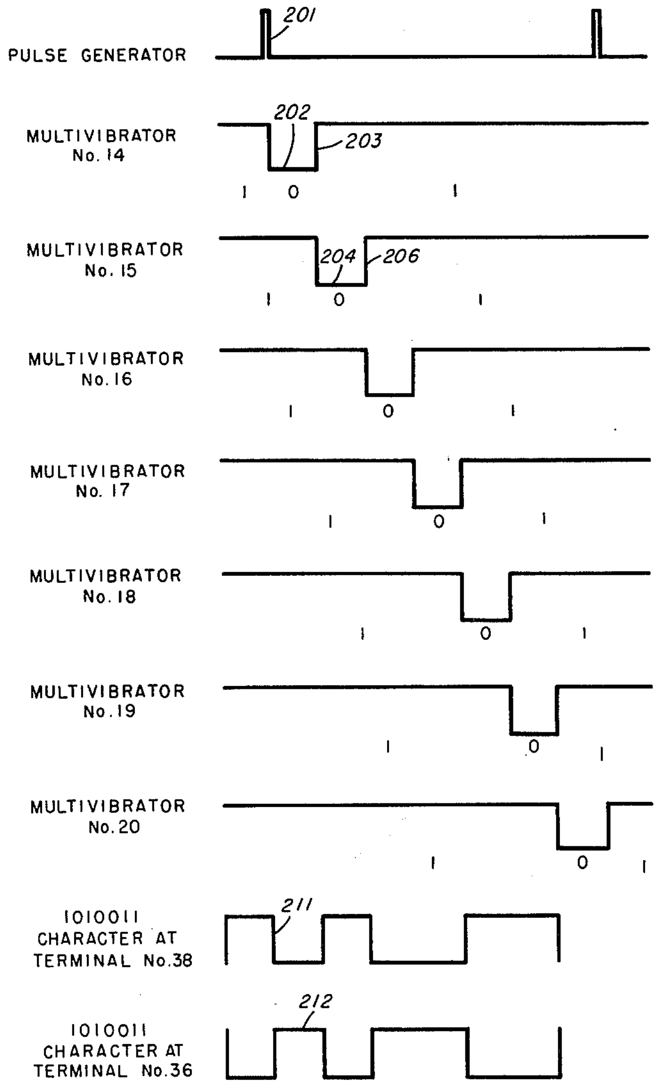
FIG. 3 illustrates particular waveforms associated with the circuits of FIG. 1 and FIG. 2.

In operation, pulses are repetitively produced by pulse generator 11. The repetition rate is determined by the position of switch 22. The pulses from generator 11 are differentiated and base clipped in differentiator-clipper circuit 12, and then coupled to the input of monostable multivibrator 14 by emitter follower 13. Pulse 201, FIG. 3, from emitter follower 13, triggers one-shot multivibrator 14 causing it to switch from its stable state to its unstable state. A 0 pulse, 202, is produced when the multivibrator switches to its unstable state. As multivibrator 14 switches back to its stable state and the output assumes the 1 level, the trailing edge 203 of pulse 202 triggers multivibrator 15 and causes it to produce a 0 pulse 204. The trailing edge 206 of pulse 204 then triggers multivibrator 16. Multivibrators 17–20 are likewise triggered in chain fashion. After all the multivibrators have fired, pulse generator 11 produces another pulse 201 starting the cycle over again.

A 0 pulse on any input of Or gate 32 produces a 0 pulse at the output of the gate. Thus, if switch 31 is closed, 0 pulse 202 will pass on to Or gate 31 and a 0 pulse will be produced at the output of the gate. On the other hand, if switch 31 is open, it will be impossible for 0 pulses from multivibrator 14 to reach Or gate 31 and the output of Or gate 31 will be at the 1-pulse level during the time intervals when multivibrator 14 produces 0 pulses. Switches 32–37 similarly control the outputs of multivibrators 15–20.

The outputs from the multivibrators may be removed in parallel fashion at output terminals 41–47. The single-pole, single-throw switches are positioned between the outputs of the mulitvibrators and the output terminals. Thus, when switch 31, for example, is open 0 pulses will never be produced at parallel output terminal 41 and the terminal will remain at the 1 level. Thus, if it is desired to continuously generate a 0101000 character, for example, it is only necessary to open the second and fourth switches, that is, switches 32 and 34. Citing a further example, to generate repetitively 1001100 characters at the parallel output terminals switches 31, 34 and 35 must be open and switches 32, 33, 36 and 37 closed.

The 0 pulses produced at the output of Or gate are of sufficient amplitude to switch Schmitt trigger 32 from one state to another. When a 0 pulse reaches the input of Schmitt trigger 32, the trigger switches states and a 0 pulse is produced on output lead 40. The pulse is coupled through emitter follower 34 to serial output terminal 38. At the same time a 1 pulse is produced on output lead 39. The 1 pulse is coupled through emitter follower 33 to serial output terminal 36. When a 1 pulse is introduced to the input of Schmitt trigger 32 reciprocal pulses, namely a 1 pulse and a 0 pulse appear, respectively, at output terminals 38 and 36. The emitter followers isolate the output terminals from the Schmitt trigger and prevent load circuits (not shown) from loading down the Schmitt trigger.

It is an advantage of the generator that the output signal at output terminal 36 is the reciprocal of the output signal at terminal 38. The generator may be thus employed with loads that require either normal logic or inverted or upside-down logic. Both output signals may be employed simultaneously when, for example, the first stage of the load circuit is a bistable multivibrator.

The pulse combination producing a particular seven-bit character is found at three places. At the first and second places, output terminals 36 and 38, the pulse combination appears in serial form as first and second pulse trains. One pulse train is the reciprocal of the other. For example, when switches 32, 34 and 35 are closed, 1010011 characters are repetitively produced at serial output terminal 38 and 0101100 characters are produced at output terminal 36, the former character having a waveform 211 (FIG. 3) and the latter having waveform 212. At the remaining place, terminals 41–47, the pulse combination appears in parallel form. For example, when 1010011 characters are produced at output terminal 38, 1 pulses are continuously produced at terminals 41, 43, 46 and 47 and 0 pulses are produced once every period of pulse generator 11 at output terminals 42, 44 and 45.

The bits of a character may be read out of the parallel output terminals simultaneously if the output of emitter follower 13 is coupled to the input of every monostable multivibrator by a separate lead (not shown) having a single-pole, single-throw switch (not shown), connected in series therewith. When the switches are all closed the bits of the character will be read out of parallel terminals 41–47 simultaneously. When all the switches are open the generator will operate unhampered, in the manner described previously.

Figure 2:
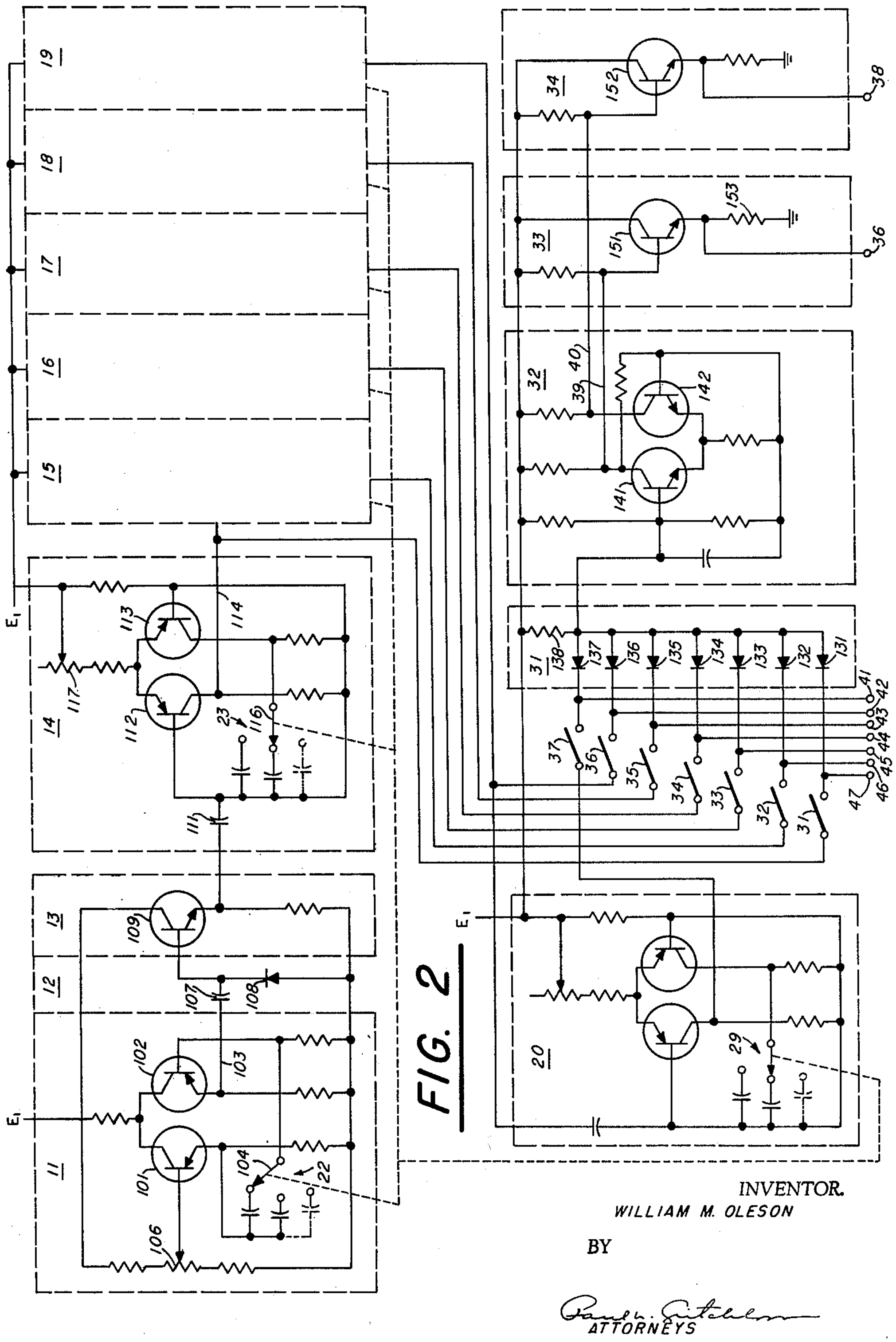
FIG. 2 is a schematic diagram of a circuit applicable in apparatus according to FIG. 1.

FIG. 2 is a schematic diagram of a circuit applicable in apparatus according to FIG. 1. Like numbers are assigned to like components. PNP transistors 101 and 102 are part of a conventional astable multivibrator. The free-running oscillator repetitively generates positive-going pulses on output lead 103. The repetition rate of these pulses is determined by the position of movable contact 104 of switch 22. At each position of contact 104 a different R-C constant intercouples transistors 101 and 102 and thus changes the repetition rate of the positive-going output pulses. Potentiometer 106 enables fine adjustment of the repetition rate. The duration of the positive-going pulses is short with respect to the period of the oscillator or generator. These pulses are differentiated and base clipped by capacitor 107 and diode 108, leaving narrow, spike-shaped positive pulses at the base of NPN transistor 109 which is connected as an emitter follower.

PNP transistors 112 and 113 are part of a conventional monostable or "one-shot" multivibrator. Pulses 201 from emitter follower 13 are coupled to the input of the multivibrator by capacitor 111. In its stable state, transistor 112 is conducting and transistor 113 is cut-off. The trailing edge of pulses from emitter follower 13 cause transistor 112 to temporarily cut-off and allow transistor 113 to temporarily conduct. During this unstable period a negative-going pulse 202 is produced on lead 114 which is connected to the input of multivibrator 15. The duration of the negative-going pulses is determined by the position of moving contact 116 of switch 23. As the contact is moved from position to position the R-C constant of the coupling circluit between transistor 112 and 113 is varied and the duration of the positive-going pulses 202. Potentiometer 117 enables the emitter voltage on transistors 112 and 113 to be adjusted. Adjustment of the potentiometer also varies the duration of pulses 202 so the potentiometer serves as a vernier for critically adjusting the duration of pulses 202.

The trailing edge 203 of pulse 202 triggers multivibrator 15 and causes it to switch from its stable state to its unstable state. In its unstable state it produces a negative pulse or a 0 pulse which in turn triggers the next succeeding multivibrator 16.

The multivibrators 14–20 have the same circuit configuration. To reduce redundancy multivibrators 15–19 are shown as phantom blocks. The switches in every multivibrator are ganged together with the switch in pulse generator 11 so that when the repetition rate of the generator is varied, the duration of the 0 pulses produced by the multivibrators is varied. The number of capacitors in each multivibrator and in the pulse generator may be increased or decreased from that shown in the diagram.

It should be appreciated that the duration of the 0 pulses produced by one multivibrator need not be the same as that produced by another multivibrator. Of course the total duration of all 0 pulses produced by the seven multivibrators should equal the period of the geneartor for a particular position of the moving contact of the generator switch. For example, to generate a seven-bit teletype character the last bit, the stopping mark, must be of different duration than the preceding six bits. To generate a teletype character at the rate of 60 words per minute, for example, the pulse generator period is set at 163 milliseconds, the first six multivibrators are adjusted to produce pulses 22 milliseconds in duration and the last multivibrator, multivibrator 20, is adjusted to produce a 31 millisecond pulse.

Referring again to FIG. 2, the ouput of multivibrators 14–20 are connected to the moving contacts of single-pole, single-throw switches 31 to 37, respectively. The other switch terminals of the switches are connected, respectively, to diodes 131–137. The diodes and resistor 138 form Or gate 31.

The output of the Or gate is directly coupled to Schmitt trigger 32 which comprises NPN transistors 141 and 142. The Schmitt trigger as well as the other specific circuits of FIG. 2 are energized by a power supply (not shown) which supplies voltage $E_1$. As the power demands of the transistors are small, the voltage $E_1$ may be supplied by a small battery thus enabling the entire apparatus to be portable.

When a 0 pulse, a negative-going pulse, reaches the cathode of one of the diodes, the particular diode experiences a greater voltage differential, conducts more current, causes a greater voltage drop across resistor 138 and produces a negative-going pulse at the output of the Or gate. The negative-going pulse causes normally conducting transistor 141 to stop conducting. When transistor 141 stops conducting, transistor 142 starts conducting. As the switch in states takes place, the collector voltage on transistor 141 increases and the collector voltage on transistor 142 decreases.

Emitter followers 33 and 34, comprising transistors 151 and 152, respectively, are coupled directly to the collectors of transistors 141 and 142, respectively. The outputs of followers 33 and 34 are connected directly to output terminals 36 and 37, respectively. One terminal is always effectively clamped to ground potential. When a pulse enters Schmitt trigger 32, output terminal 37 is effectively clamped to ground and conversely, when a 1 pulse enters the trigger output terminal 38 is effectively clamped to ground. When a 0 pulse enters the trigger, the collector voltage of transistor 142 drops and cuts off transistor 152. When transistor 152 is cut off, output terminal 37 is effectively tied to ground.

Although a seven-bit character generator has been disclosed in FIGS. 1 and 2, it should be appreciated that different length characters can be generated by varying the number of monostable multivibrators (one multivibrator for each bit) and adjusting the period of the pulse generator.

Obviously many modifications and variations of the present invention are possible in the light of the above teachings. It is therefore to be understood that within the scope of the appended claims the invention may be practiced otherwise than as specifically described.

What is claimed is:

1. In combination in a system for repetitiously generating a character of $n$ binary bits, where $n$ is any positive integer, a clock pulse generator, said generator being operable at the frequency of the desired character repetition rate, a series of $n$ cascaded monostable multivibrators, each multivibrator being responsive to the trailing edge of the pulse of the preceding multivibrator of the series, the sum of the durations of the unstable states of the $n$ multivibrators being substantially equal to a pulse interval of said clock generator, an ouput circuit coupled to each monostable multivibrator, a plurality of single pole single throw switches, said switches being coupled, respectively, in said output circuits, a plurality of output terminals connected, respectively, through said switches to said multivibrator output circuits for repetitively producing in parallel the $n$ bits of said character, and an OR gate with $n$ inputs, said inputs being coupled, respectively, in multiple with said output terminals for repetitively producing serially the $n$ bits of said character.

2. Apparatus for repetitively generating a character of $n$ binary bits comprising;

a clock pulse generator having an output, $n$ monostable multivibrators, where $n$ is any positive integer, said multivibrators being coupled in cascade and each being triggered to the unstable state by the trailing edge of the pulse of the preceding stage, the first in the series of said multivibrators being connected to the output of said clock generator so that each of said multivibrators successively switches momentarily to the unstable state once during each period of said clock pulse generator, a binary switch coupled in the output of each multivibrator for encoding the multivibrator outputs with the desired $n$ bits, an OR gate with input circuits, coupled, respectively, to each switch, a voltage sensitive bistable trigger coupled to the output circuit of said OR gate, so that said $n$ bits of said character are serially formed at the output of said bistable trigger, and $n$ output circuits coupled to said switches for extracting in parallel the $n$ bits.

References Cited by the Examiner

UNITED STATES PATENTS

| | | | |
|---|---|---|---|
| 2,412,642 | 12/46 | Wilkerson | 178—79 |
| 2,953,642 | 9/60 | Zahner | 178—79 |

ROBERT H. ROSE, *Primary Examiner.*